US010784799B2

(12) United States Patent
Nemoto

(10) Patent No.: US 10,784,799 B2
(45) Date of Patent: Sep. 22, 2020

(54) ELECTRIC MOTOR CAPACITY SELECTION DEVICE, CAPACITY SELECTION METHOD, AND CAPACITY SELECTION PROGRAM

(71) Applicant: Mitsubishi Electric Corporation, Tokyo (JP)

(72) Inventor: Shota Nemoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/339,007

(22) PCT Filed: Jan. 31, 2018

(86) PCT No.: PCT/JP2018/003204
§ 371 (c)(1),
(2) Date: Apr. 3, 2019

(87) PCT Pub. No.: WO2019/150484
PCT Pub. Date: Aug. 8, 2019

(65) Prior Publication Data
US 2019/0372485 A1 Dec. 5, 2019

(51) Int. Cl.
H02P 5/46 (2006.01)
H02P 29/00 (2016.01)
(Continued)

(52) U.S. Cl.
CPC ............ H02P 5/46 (2013.01); G05B 19/402 (2013.01); G05B 19/414 (2013.01); H02P 6/04 (2013.01);
(Continued)

(58) Field of Classification Search
CPC ......... G05B 23/02; G05B 19/18; H02P 29/00; H02P 5/46; B25J 9/22
See application file for complete search history.

(56) References Cited

U.S. PATENT DOCUMENTS 9,753,450 B2   9/2017  Ogawa et al.
10,449,676 B2* 10/2019 Monsarrat ............. B25J 13/085
(Continued)

FOREIGN PATENT DOCUMENTS

CN    107530879 A    1/2018
EP    2149982 A1     2/2010
(Continued)

OTHER PUBLICATIONS

Decision to Grant a Patent received for Japanese Patent Application No. 2018-540492, dated Nov. 6, 2018, 4 pages including English Translation.

(Continued)

*Primary Examiner* — Eduardo Colon Santana
*Assistant Examiner* — Said Bouziane
(74) *Attorney, Agent, or Firm* — Xsensus LLP

(57) ABSTRACT

An electric motor capacity selection device includes: a multi-axis system model holding unit that holds a plurality of types of multi-axis system models each representing a configuration of a multi-axis system constructed by combination of a plurality of machine elements and a plurality of electric motors; a capacity selection unit that selects, based on a selected multi-axis system model that is one multi-axis system model selected from among the plurality of types of multi-axis system models held by the multi-axis system model holding unit, capacities of the electric motors constituting the multi-axis system model represented by the selected multi-axis system model; and a selection result notification unit that makes notification of a selection result by the capacity selection unit.

17 Claims, 10 Drawing Sheets

(51) Int. Cl.
*G05B 19/414* (2006.01)
*G05B 19/402* (2006.01)
*H02P 6/04* (2016.01)

(52) U.S. Cl.
CPC .... *H02P 29/00* (2013.01); *G05B 2219/43036* (2013.01); *G05B 2219/50* (2013.01)

(56) References Cited

U.S. PATENT DOCUMENTS

| | | | | |
|---|---|---|---|---|
| 2006/0100723 | A1* | 5/2006 | Sun | G05B 19/4141 700/61 |
| 2014/0365061 | A1* | 12/2014 | Vasquez | G05D 1/021 701/23 |
| 2015/0212518 | A1* | 7/2015 | Umeda | H02P 5/46 318/567 |
| 2016/0236414 | A1* | 8/2016 | Reese | G05B 19/41875 |
| 2016/0297073 | A1* | 10/2016 | Whalen-Robinson | B25J 9/1633 |

FOREIGN PATENT DOCUMENTS

| | | |
|---|---|---|
| JP | 2002-91572 A | 3/2002 |
| JP | 2010187464 A | 8/2010 |
| JP | 2016-81298 A | 5/2016 |
| WO | 2008/139800 A1 | 11/2008 |
| WO | 2014/054142 A1 | 4/2014 |
| WO | 2016/185590 A1 | 11/2016 |

OTHER PUBLICATIONS

International Search Report and Written Opinion dated May 15, 2018, 2018 for PCT/JP2018/003204 filed on Jan. 31, 2018, 3 pages only in Japanese.

Office Action issued in Taiwanese Application 108102401 dated Nov. 26, 2019.

Office Action dated Aug. 19, 2019, issued in corresponding Korean Patent Application No. 10-2019-7013670, 11 pages (with English Translation).

Office Action dated Apr. 15, 2020 in Chinese Patent Application No. 201880004446.8, 16 pages.

Office Action dated Jun. 2, 2020 German Patent Application No. 11 2018 000 136.9, 8 pages.

* cited by examiner

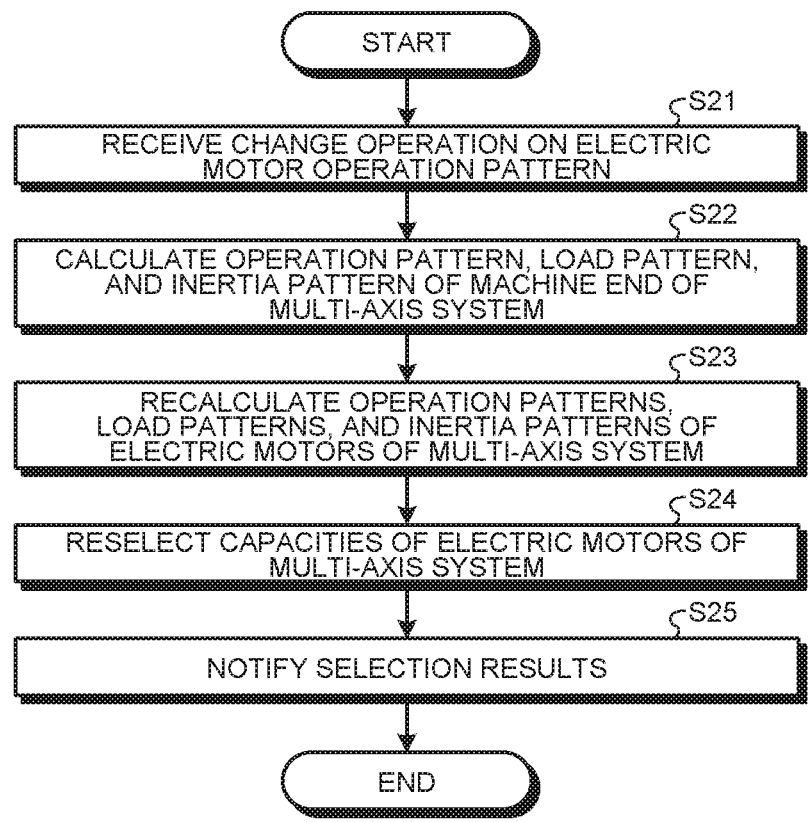

ELECTRIC MOTOR CAPACITY SELECTION DEVICE, CAPACITY SELECTION METHOD, AND CAPACITY SELECTION PROGRAM

CROSS-REFERENCE TO RELATED APPLICATIONS

The present application is based on PCT filing PCT/JP2018/003204, filed Jan. 31, 2018, which is incorporated herein by reference.

FIELD

The present invention relates to a capacity selection device, a capacity selection method, and a capacity selection program for electric motors in a multi-axis system including two or more electric motors.

BACKGROUND

In recent years, a multi-axis system including a plurality of electric motors whose states affect each other has been used in a wide range including those for industrial applications such as a semiconductor manufacturing apparatus and machine tool device as well as those for non-industries such as medical care, welfare, and service.

Patent Literature 1 describes an inventive technique for selecting capacities of a number of electric motors constituting a multi-axis system. An electric motor capacity selection device described in Patent Literature 1 performs a simulation using information such as selection of an element model, connection information between element models, and a physical parameter for each element model, to select a capacity of each electric motor.

CITATION LIST

Patent Literature

Patent Literature 1: International Publication No. WO 2016/185590 A

SUMMARY

Technical Problem

The electric motor capacity selection device described in Patent Literature 1 has a high degree of freedom in a multi-axis system to be constructed, but requires that the user should perform the work of connecting machine elements to construct a multi-axis system. Therefore, before starting the use of the electric motor capacity selection device, the user needs to acquire knowledge necessary in the work of connecting machine elements. When using the electric motor capacity selection device, the user needs to work to connect the machine elements. Thus, the inventive technique described in Patent Literature 1 has a problem that the user has a heavy burden.

The present invention has been made in view of the above circumstances, and its object is to provide an electric motor capacity selection device capable of reducing the burden on the user.

Solution to Problem

In order to solve the above-described problem and achieve the object, an electric motor capacity selection device according to the present invention includes a multi-axis system model holding unit to hold a plurality of types of multi-axis system models each representing a configuration of a multi-axis system constructed by combination of a plurality of machine elements and a plurality of electric motors. The electric motor capacity selection device also has a capacity selection unit to select, based on a selected multi-axis system model that is one multi-axis system model selected from among the plurality of types of multi-axis system models held by the multi-axis system model holding unit, capacities of the electric motors constituting a multi-axis system model represented by the selected multi-axis system model. The electric motor capacity selection device further includes a selection result notification unit to make notification of a selection result by the capacity selection unit.

Advantageous Effects of Invention

The electric motor capacity selection device according to the present invention has an advantageous effect of being able to reduce the burden on the user.

BRIEF DESCRIPTION OF DRAWINGS

FIG. 12 is a flowchart illustrating an example of an operation in which the electric motor capacity selection device according to the embodiment performs selection of an electric motor again.

DESCRIPTION OF EMBODIMENT

Hereinafter, an electric motor capacity selection device, a capacity selection method, and a capacity selection program according to an embodiment of the present invention will be described in detail with reference to the drawings. Note that the invention is not necessarily limited by the embodiment.

Embodiment

Figure 1:
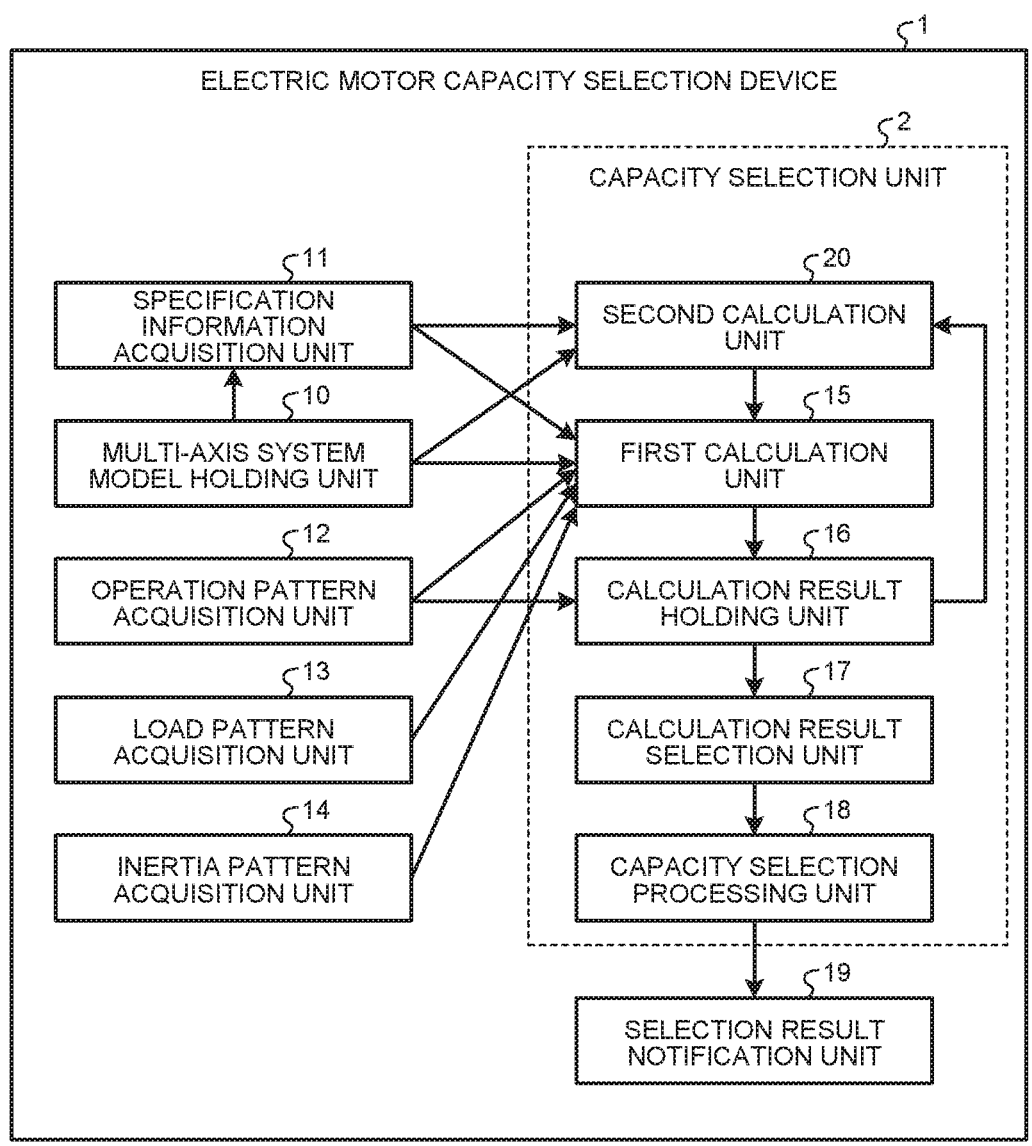
FIG. 1 is a diagram illustrating a configuration example of an electric motor capacity selection device according to an embodiment.

FIG. 1 is a diagram illustrating a configuration example of an electric motor capacity selection device according to an embodiment of the present invention. An electric motor capacity selection device 1 illustrated in FIG. 1 selects the capacities of electric motors configured to drive a plurality of drive shafts provided in a multi-axis system, respectively. A multi-axis system is composed of a combination of a plurality of machine elements and a plurality of electric motors. Specifically, in a multi-axis system, a plurality of machine elements are connected to each other via drive shafts, and the drive shafts are rotationally driven by electric motors. An electric motor whose capacity is selected by the electric motor capacity selection device 1 is assumed to be composed of a motor and a drive circuit for driving the motor. That is, the electric motor capacity selection device 1 selects the capacities of a motor and the drive circuit of the motor. The drive circuit includes circuits such as an inverter and a servo amplifier.

As illustrated in FIG. 1, the electric motor capacity selection device 1 includes a multi-axis system model holding unit 10, a specification information acquisition unit 11, an operation pattern acquisition unit 12, a load pattern acquisition unit 13, an inertia pattern acquisition unit 14, a first calculation unit 15, a calculation result holding unit 16, a calculation result selection unit 17, a capacity selection processing unit 18, a selection result notification unit 19, and a second calculation unit 20. The first calculation unit 15, the calculation result holding unit 16, the calculation result selection unit 17, the capacity selection processing unit 18, and the second calculation unit 20 constitute a capacity selection unit 2. In the following description, the electric motor capacity selection device may be sometimes referred to as a "capacity selection device".

The multi-axis system model holding unit 10 holds multi-axis system models each representing the configuration of a multi-axis system. Each multi-axis system model includes information such as the types and the numbers of machine elements constituting the multi-axis system, the connection relationships between the machine elements, and the correspondence relationships between the machine elements and electric motors. The multi-axis system model holding unit 10 holds multi-axis system models for a plurality of types of multi-axis systems having different configurations. The multi-axis system models are created in advance by an external computer or the like and written in the multi-axis system model holding unit 10. When the first calculation unit 15 performs calculation described later, the multi-axis system model holding unit 10 outputs one of the multi-axis system models it holds to the first calculation unit 15. When the second calculation unit 20 performs calculation described later, the multi-axis system model holding unit 10 outputs one of the multi-axis system models it holds to the second calculation unit 20.

The specification information acquisition unit 11 acquires specification information on the multi-axis system model from the outside. Specifically, the specification information acquisition unit 11 receives input of specification information on the multi-axis system model by the user. Examples of the specification information on the multi-axis system model are the sizes and masses of machine elements constituting the multi-axis system. Upon acquiring specification information from the outside, the specification information acquisition unit 11 holds the specification information. When the first calculation unit 15 performs calculation described later, the specification information acquisition unit 11 outputs the specification information to the first calculation unit 15. When the second calculation unit 20 performs calculation described later, the specification information acquisition unit 11 outputs the specification information to the second calculation unit 20.

The operation pattern acquisition unit 12 acquires from the outside the operation pattern of the machine end of the multi-axis system, which is a portion for the multi-axis system to hold a workpiece and make its work. Specifically, the operation pattern acquisition unit 12 receives input of the operation pattern of the machine end of the multi-axis system by the user. The machine end of the multi-axis system is changed in position by electric motors constituting the multi-axis system driving drive shafts. When the multi-axis system is a machine tool for machining a workpiece, a tool or a workpiece is attached to the machine end. The operation pattern is information representing change over time in the position of the machine end of the multi-axis system. Upon acquiring the operation pattern, the operation pattern acquisition unit 12 outputs the pattern to the first calculation unit 15. In addition, the operation pattern acquisition unit 12 receives from the outside an operation for changing an operation pattern held in the calculation result holding unit 16 described later, and changes the operation pattern held in the calculation result holding unit 16 in accordance with the received operation contents.

The load pattern acquisition unit 13 acquires the load pattern of the machine end of the multi-axis system from the outside. Specifically, the load pattern acquisition unit 13 receives input of the load pattern of the machine end of the multi-axis system by the user. The load pattern is information representing change over time in a load applied to the machine end of the multi-axis system. Upon acquiring a load pattern, the load pattern acquisition unit 13 outputs this pattern to the first calculation unit 15.

The inertia pattern acquisition unit 14 acquires the inertia pattern of the machine end of the multi-axis system from the outside. Specifically, the inertia pattern acquisition unit 14 receives input of the inertia pattern of the machine end of the multi-axis system by the user. The inertia pattern is information representing change over time in inertia applied to the machine end of the multi-axis system. Upon acquiring an inertia pattern, the inertia pattern acquisition unit 14 outputs this pattern to the first calculation unit 15.

The first calculation unit 15 calculates an operation pattern, a load pattern, and an inertia pattern of each of the electric motors constituting the multi-axis system.

The calculation result holding unit 16 holds the results of the calculation by the first calculation unit 15, that is, the operation pattern, the load pattern, and the inertia pattern of each of the electric motors, which have been calculated by the first calculation unit 15.

The calculation result selection unit 17 selects some of the calculation results held by the calculation result holding unit 16, and inputs the selected calculation result(s) to the capacity selection processing unit 18.

The capacity selection processing unit 18 selects the capacities of the electric motors, based on the calculation results inputted from the calculation result selection unit 17.

The selection result notification unit 19 makes notification of the selection results of the capacity selection processing unit 18.

The second calculation unit 20 calculates the operation pattern, the load pattern, and the inertia pattern of the machine end of the multi-axis system.

Figure 2:
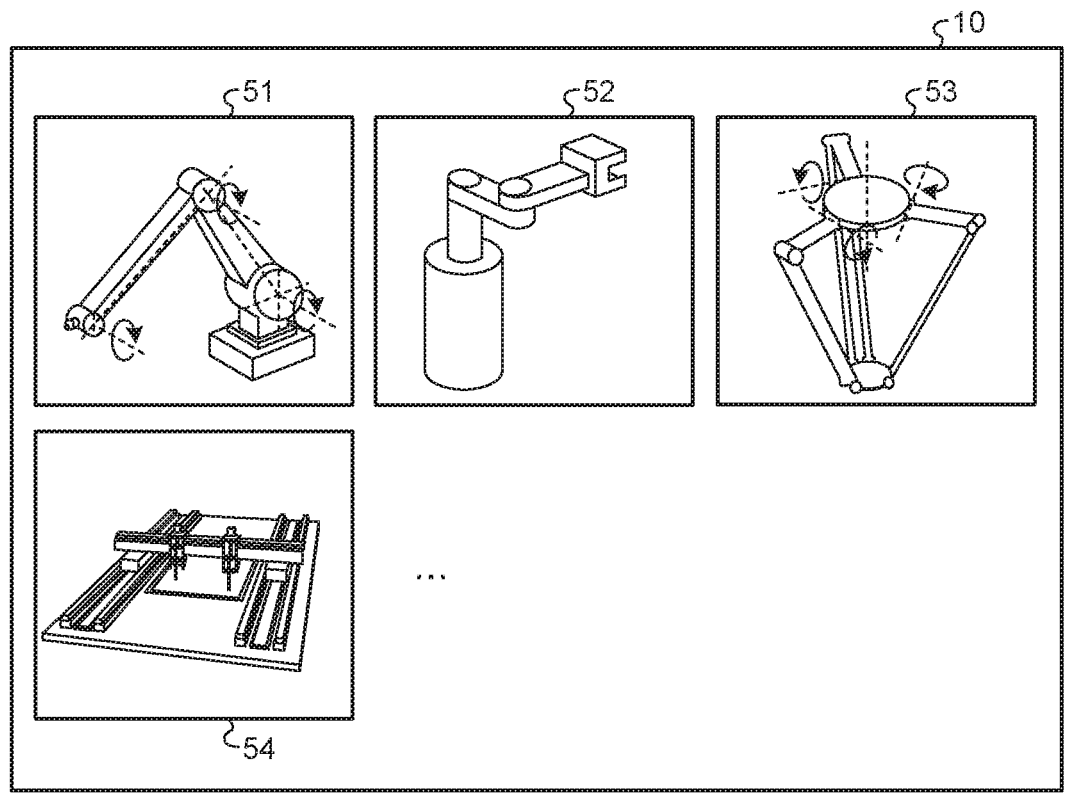
FIG. 2 is a diagram illustrating an example of a multi-axis system model holding unit according to the embodiment.

FIG. 2 is a diagram illustrating an example of the multi-axis system model holding unit 10 of the electric motor capacity selection device 1 according to the embodiment. As illustrated in FIG. 2, the multi-axis system model holding unit 10 holds multi-axis system models of two or more types of multi-axis systems. In the example illustrated in FIG. 2, the multi-axis system model holding unit 10 holds a multi-axis system model 51 representing a vertical articulated robot, a multi-axis system model 52 representing a horizontal articulated robot, a multi-axis system model 53 representing a parallel link robot, a multi-axis system model 54 representing a gantry robot, etc. The multi-axis system models held by the multi-axis system model holding unit 10 are not limited to those illustrated in FIG. 2.

Figure 3:
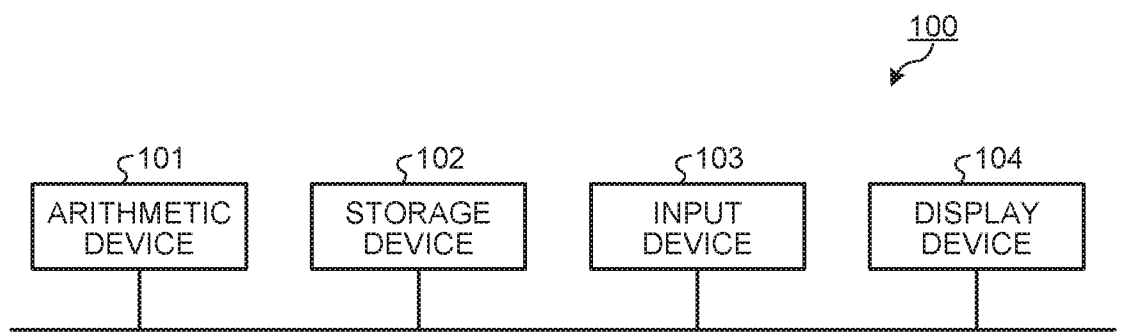
FIG. 3 is a diagram illustrating an example of hardware for implementing the electric motor capacity selection device according to the embodiment.

FIG. 3 is a diagram illustrating an example of hardware for implementing the electric motor capacity selection device 1 according to the embodiment. The capacity selection device 1 can be implemented by a computer 100 including an arithmetic device 101, a storage device 102, an input device 103, and a display device 104 illustrated in FIG. 3.

A central processing unit (CPU) can be applied to the arithmetic device 101, and a random access memory (RAM) or a read-only memory (ROM) can be applied to the storage device 102. A mouse, a keyboard, a touch panel, or the like can be applied to the input device 103, and a liquid crystal monitor, a display, or the like can be applied to the display device 104.

The first calculation unit 15, the calculation result selection unit 17, the capacity selection processing unit 18, and the second calculation unit 20 of the capacity selection device 1 are implemented by the arithmetic device 101 executing programs for operating as these units. The programs for operating as the first calculation unit 15, the capacity selection processing unit 18, and the second calculation unit 20 are stored in advance in the storage device 102. By reading the programs from the storage device 102 and executing them, the arithmetic device 101 operates as the first calculation unit 15, the capacity selection processing unit 18, and the second calculation unit 20.

The multi-axis system model holding unit 10 and the calculation result holding unit 16 of the capacity selection device 1 are implemented by the storage device 102. The specification information acquisition unit 11, the operation pattern acquisition unit 12, the load pattern acquisition unit 13, and the inertia pattern acquisition unit 14 of the capacity selection device 1 are implemented by the input device 103. The selection result notification unit 19 is implemented by the display device 104.

Next, the operation of the capacity selection device 1 will be described. Here, the operation of the capacity selection device 1 selecting the capacities of the electric motors will be described with a case where the multi-axis system is a two-axis manipulator as an example.

Figure 4:
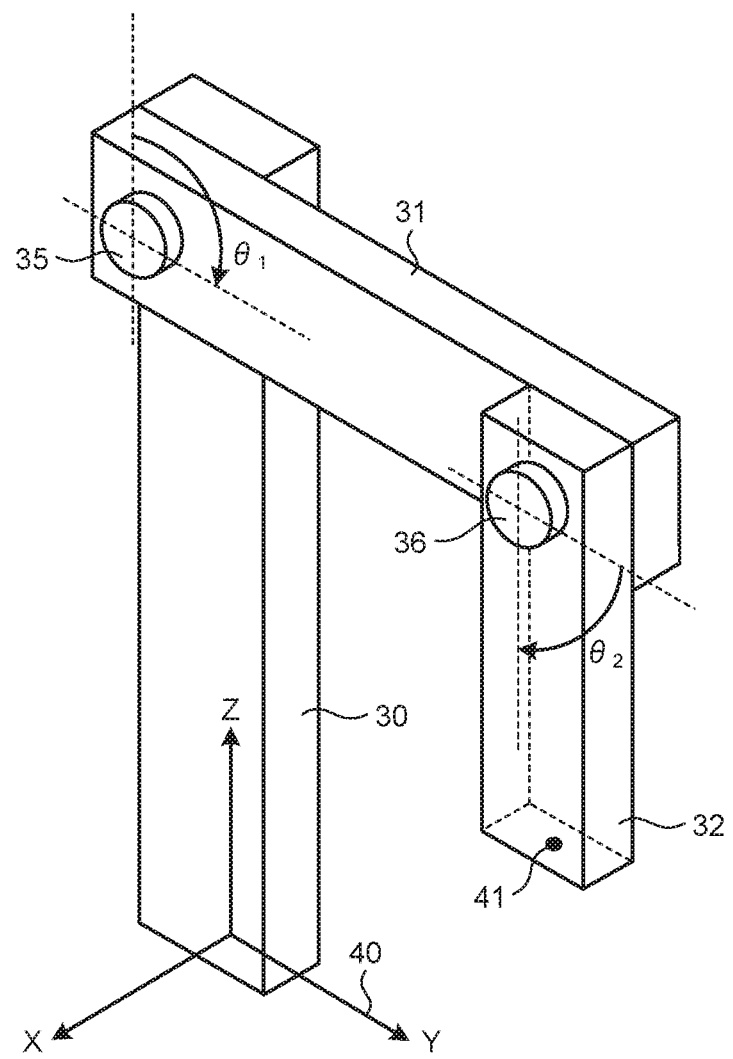
FIG. 4 is a schematic diagram of a mechanism of a two-axis manipulator held in the multi-axis system model holding unit according to the embodiment.

FIG. 4 is a schematic diagram of the mechanism of the two-axis manipulator held in the multi-axis system model holding unit 10 of the capacity selection device 1 according to the embodiment.

The two-axis manipulator that is the multi-axis system illustrated in FIG. 4 is configured to include a first link 30, a second link 31, and a third link 32. The first link 30 has one end fixed and is not changed in position by external forces. One end of the second link 31 is connected to the other end of the first link 30 via a first speed reducer and a first coupling (not illustrated). The second link 31 is rotationally driven by a first electric motor 35 fixed to the other end of the first link 30 via the first speed reducer and the first coupling. One end of the third link 32 is connected to the other end of the second link 31 via a second speed reducer and a second coupling (not illustrated). The third link 32 is rotationally driven by a second electric motor 36 fixed to the other end of the second link 31 via the second speed reducer and the second coupling. The other end of the third link 32 includes a machine end 41 of the two-axis manipulator. The machine end 41 corresponds to the center point of an end face of the third link 32. The position of the machine end 41 is represented by a coordinate system 40 illustrated. The coordinate system 40 is a coordinate system fixed at the one end of the first link 30. An angle $\theta_1$ is a rotation angle of the first electric motor 35, and an angle $\theta_2$ is a rotation angle of the second electric motor 36. The machine end 41 moves to a desired position in a space defined based on the multi-axis system model by the operation of at least one of the first electric motor 35 and the second electric motor 36. The first link 30, the second link 31, the third link 32, the first speed reducer, the first coupling, the second speed reducer, and the second coupling are machine elements constituting the two-axis manipulator.

Figure 5:
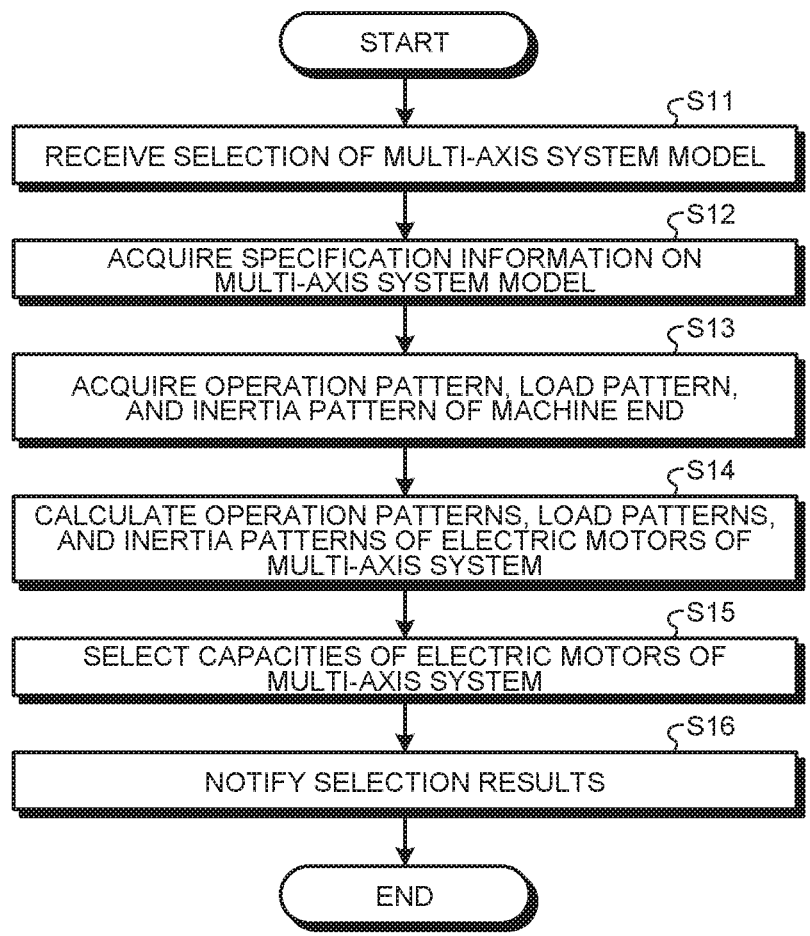
FIG. 5 is a flowchart illustrating an example of an operation of the electric motor capacity selection device according to the embodiment.

FIG. 5 is a flowchart illustrating an example of the operation of the capacity selection device 1 according to the embodiment. The flowchart illustrated in FIG. 5 represents the operation of selecting the capacities of the electric motors of the multi-axis system by the capacity selection device 1.

The operation according to the flowchart illustrated in FIG. 5 is started when an operation to instruct the start of the electric motor capacity selection operation is received from the user.

Upon starting the operation, first, the capacity selection device 1 displays on the display device 104 a menu for allowing the user to select one of the multi-axis system models held in the multi-axis system model holding unit 10, and receives the selection of a multi-axis system model (step S11). Here, the explanation will be continued on the assumption that the two-axis manipulator having the configuration illustrated in FIG. 4 has been selected. When the two-axis manipulator having the configuration illustrated in FIG. 4 is selected, the first electric motor 35 serves as a first electric motor to be capacity-selected, and the second electric motor 36 serves as a second electric motor to be capacity-selected. The selection result of the multi-axis system model is notified to the specification information acquisition unit 11.

Next, the capacity selection device 1 acquires specification information on the selected multi-axis system model (step S12). Specifically, the capacity selection device 1 displays on the display device 104 a menu for allowing the user to enter the specification information on the selected multi-axis system, and receives the entry, thereby acquiring the specification information. In step S12, the specification information acquisition unit 11 acquires the specification information on the multi-axis system model selected in step S11. Examples of the specification information acquired by the specification information acquisition unit 11 include the sizes, masses, moments of inertia, speed reduction ratios, coefficients of friction, etc. of the machine elements constituting the multi-axis system model. Specific examples of the specification information acquired by the specification information acquisition unit 11 are the length of the first link 30, the length and mass of the second link 31, the length and mass of the third link 32, the speed reduction ratio of the first speed reducer, the speed reduction ratio of the second speed reducer, the moment of inertia and the coefficient of friction of a connection part between the first link 30 and the second link 31, and the moment of inertia and the coefficient of friction of a connection part between the second link 31 and the third link 32. In this example, the connection part between the first link 30 and the second link 31 includes the first speed reducer and the first coupling. The connection part between the second link 31 and the third link 32 includes the second speed reducer and the second coupling. Specification information used in both selection operations for the first electric motor to be capacity-selected and the second electric motor to be capacity-selected may have a configuration allowing the specification information to be used for a selection operation of each of the motors to be capacity-selected once the specification information is entered. That is, the specification information acquisition unit 11 acquires specification information common to both selection operations for the first electric motor to be capacity-selected and the second electric motor to be capacity-selected from a one-time entry without duplicate entry of the specification information. For example, the mass of the third link 32 is required in both the selection operations of the first electric motor to be capacity-selected and the second electric motor to be capacity-selected. In this situation, when the information is entered for one electric motor to be capacity-selected, this entry is handled as an entry of the information for the other electric motor to be capacity-selected. Adopting this configuration can achieve a reduced workload on the user and reduced working hours. It can also prevent such a mistake as to erroneously enter different information in spite of a situation where the same information should be entered.

Next, the capacity selection device 1 acquires the operation pattern, the load pattern, and the inertia pattern of the machine end 41 of the selected multi-axis system model (step S13). Specifically, the capacity selection device 1 displays on the display device 104 a menu for allowing the user to enter the operation pattern, the load pattern, and the inertia pattern of the machine end 41, and receives the entry, thereby acquiring the operation pattern, the load pattern, and the inertia pattern of the machine end 41. In step S13, the operation pattern acquisition unit 12 acquires the operation pattern of the machine end 41, the load pattern acquisition unit 13 acquires the load pattern of the machine end 41, and the inertia pattern acquisition unit 14 acquires the inertia pattern of the machine end 41.

Figure 6:
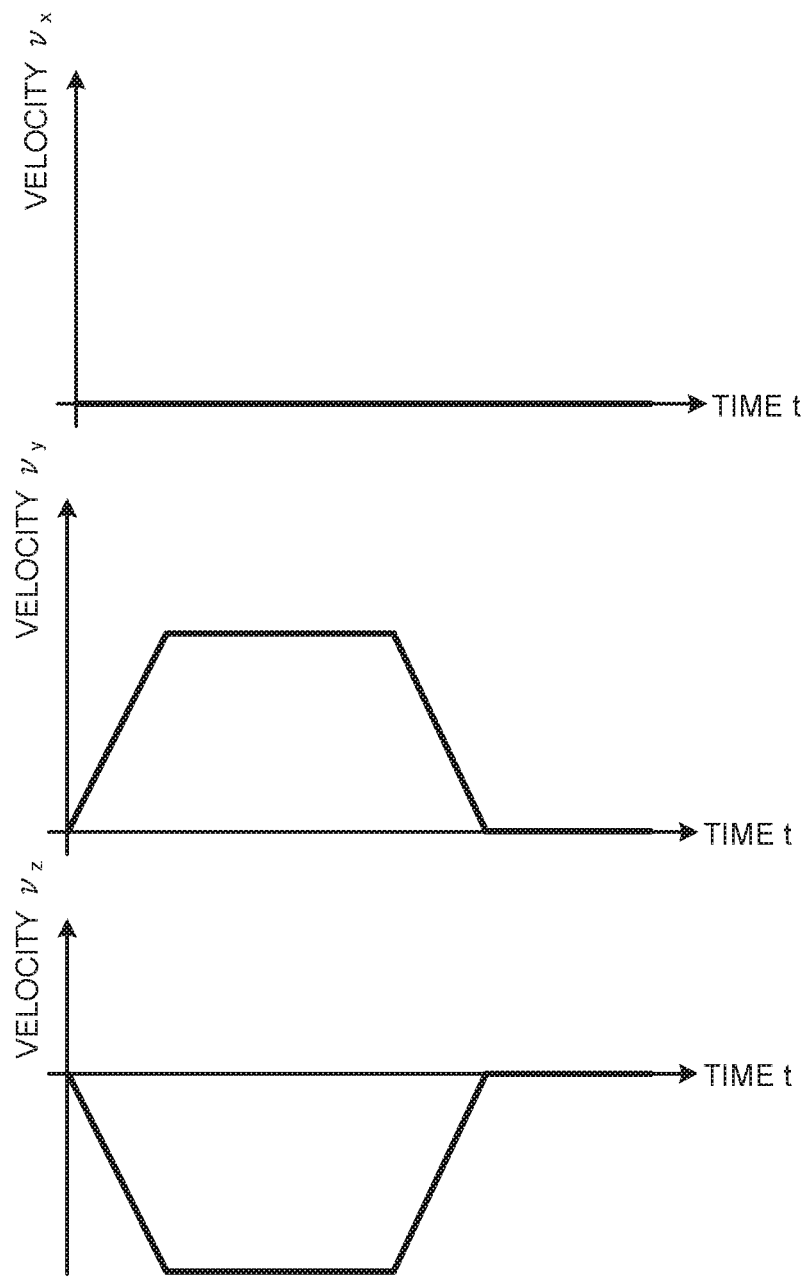
FIG. 6 is a set of graphs illustrating an example of an operation pattern of a machine end acquired by an operation pattern acquisition unit according to the embodiment.

Examples of the operation pattern of the machine end 41 acquired by the operation pattern acquisition unit 12 are the position, velocity, acceleration, angle, angular velocity, and angular acceleration of the machine end 41, or any combination of them. FIG. 6 is a set of graphs illustrating an example of the operation pattern of the machine end 41 acquired by the operation pattern acquisition unit 12. In FIG. 6, $v_x$ is a velocity in the X direction in the coordinate system 40 illustrated in FIG. 4. $v_y$ is a velocity in the Y direction in the coordinate system 40. $v_z$ is a velocity in the Z direction in the coordinate system 40.

Figure 7:
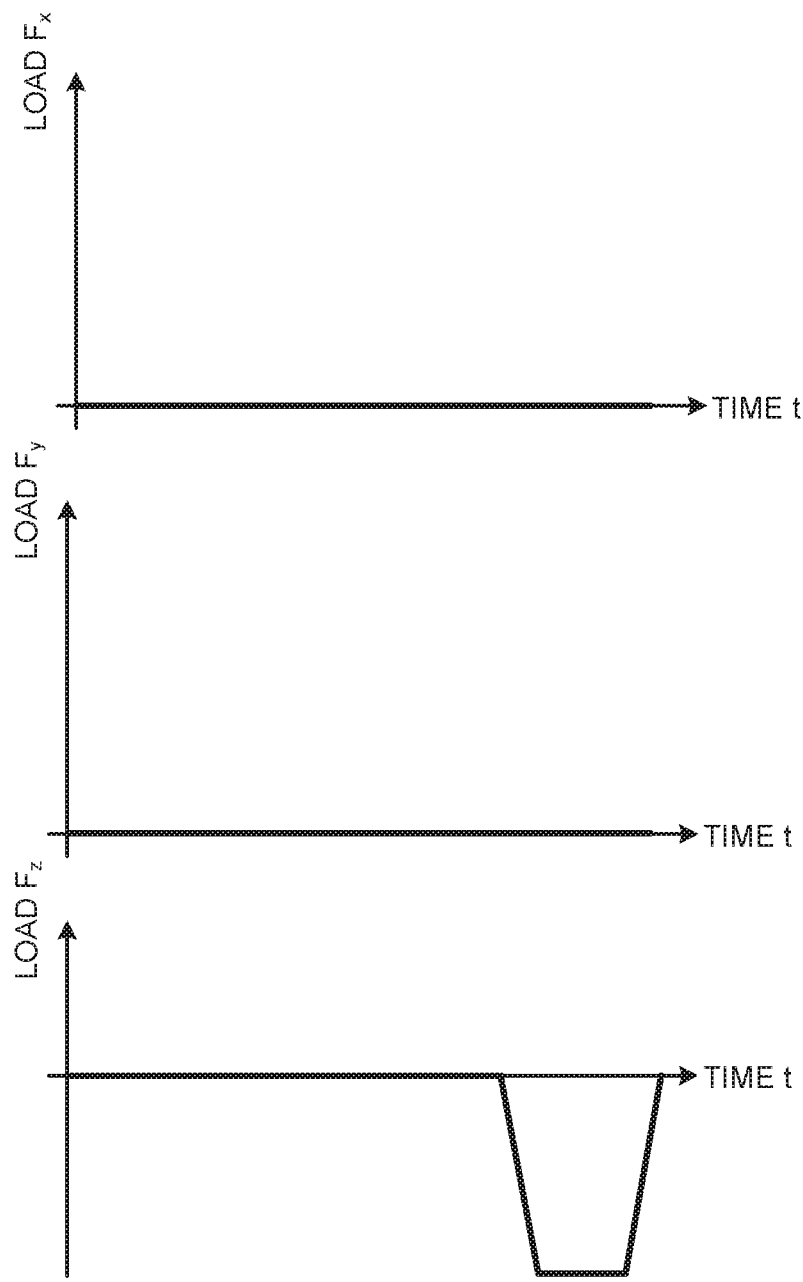
FIG. 7 is a set of graphs illustrating an example of a load pattern of the machine end acquired by a load pattern acquisition unit according to the embodiment.

Examples of the load pattern of the machine end 41 acquired by the load pattern acquisition unit 13 are force, torque, or a combination of them. FIG. 7 is a set of graphs illustrating an example of the load pattern of the machine end 41 acquired by the load pattern acquisition unit 13. In FIG. 7, $F_x$ is a force acting in the X direction in the coordinate system 40 illustrated in FIG. 4. $F_y$ is a force acting in the Y direction in the coordinate system 40. $F_z$ is a force acting in the Z direction in the coordinate system 40.

Figure 8:
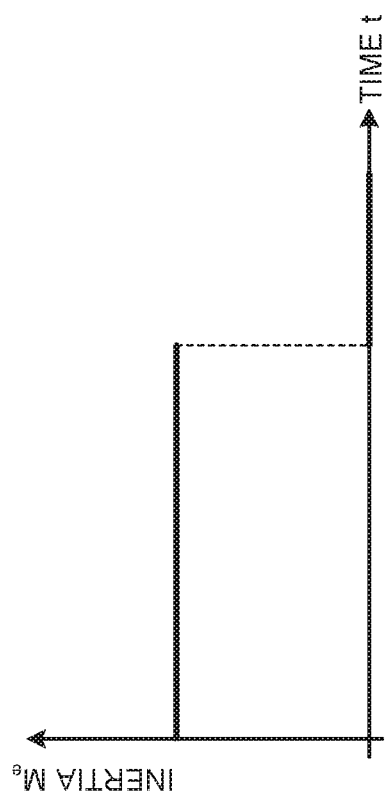
FIG. 8 is a graph illustrating an example of an inertia pattern of the machine end acquired by an inertia pattern acquisition unit according to the embodiment.

Examples of the inertia pattern of the machine end 41 acquired by the inertia pattern acquisition unit 14 are the mass, the moment of inertia, or a combination of them. FIG. 8 is a graph illustrating an example of the inertia pattern of the machine end 41 acquired by the inertia pattern acquisition unit 14. In FIG. 8, $M_e$ is a mass at the machine end 41.

Next, the capacity selection device 1 calculates the operation patterns, the load patterns, and the inertia patterns of the electric motors constituting the multi-axis system, based on the information acquired in steps S11 to S13 (step S14). In step S14, the first calculation unit 15 calculates the operation patterns, the load patterns, and the inertia patterns. Specifically, with the multi-axis system model, the specification information on the multi-axis system model, the operation pattern of the machine end of the multi-axis system, the load pattern of the machine end of the multi-axis system, and the inertia pattern of the machine end of the multi-axis system being set as input information, the first calculation unit 15 performs inverse kinematics calculation using these input pieces of information, thereby determining the operation patterns, the load patterns, and the inertia patterns of each electric motor to be capacity-selected. In this example, the capacity selection device 1 calculates the operation patterns, the load patterns, and the inertia patterns of the first electric motor 35, which is the first electric motor to be capacity-selected, and the second electric motor 36, which is the second electric motor to be capacity-selected.

Figure 9:
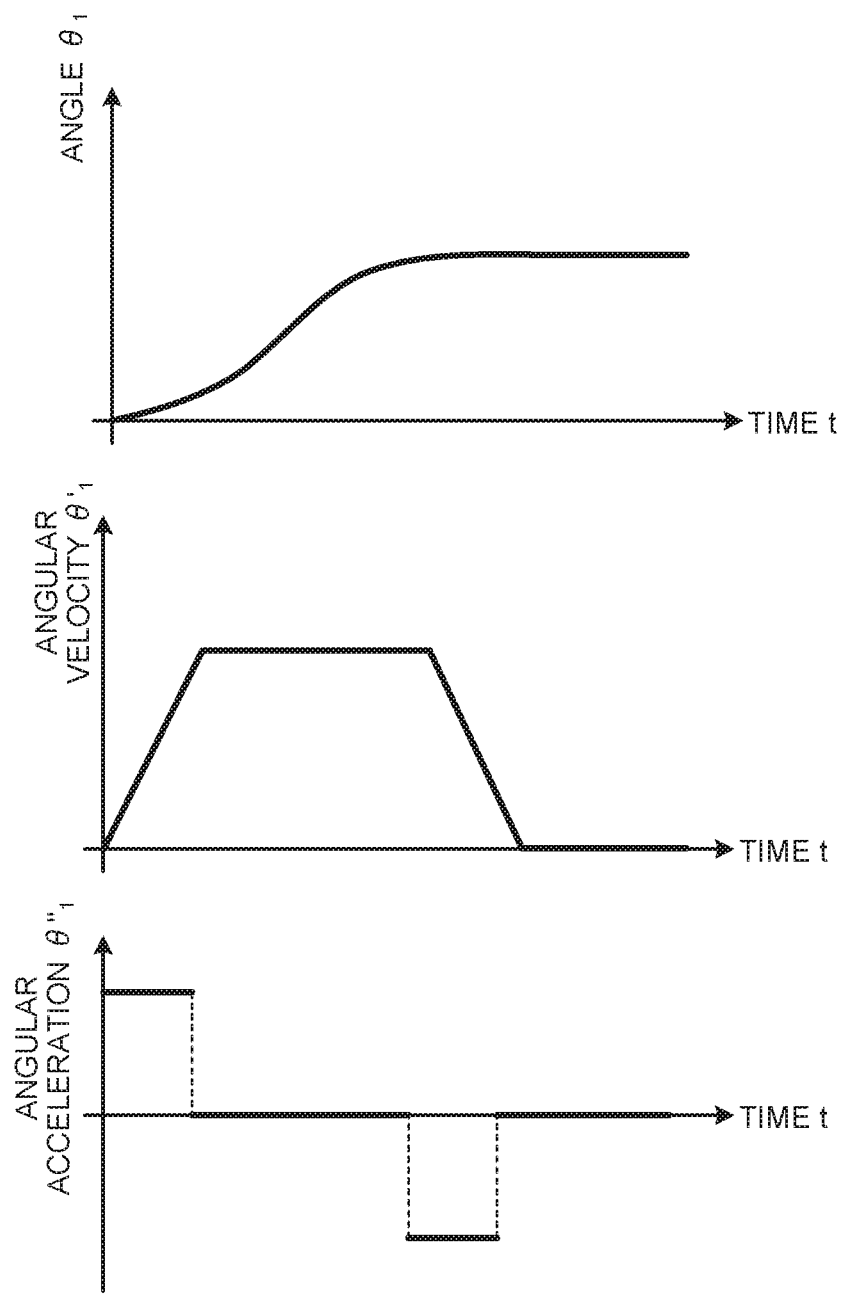
FIG. 9 is a set of graphs illustrating an example of an operation pattern calculated by a first calculation unit according to the embodiment.

An example of the operation patterns calculated by the first calculation unit 15 is a combination of the position, the velocity, and the acceleration, or a combination of the angle, the angular velocity, and the angular acceleration. FIG. 9 is a set of graphs illustrating an example of the operation pattern calculated by the first calculation unit 15. In FIG. 9, $\theta_1$ is the angle of the first electric motor 35, $\theta'_1$ is the angular velocity of the first electric motor 35, and $\theta''_1$ is the angular acceleration of the first electric motor 35. The first calculation unit 15 also calculates the angle, the angular velocity, and the angular acceleration of the second electric motor 36.

Figure 10:
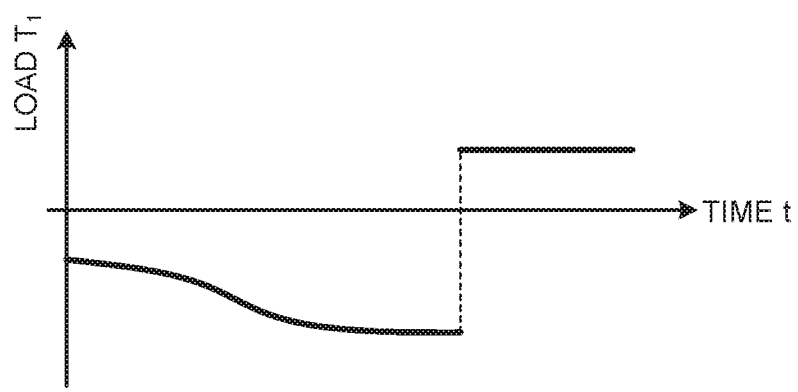
FIG. 10 is a graph illustrating an example of a load pattern calculated by the first calculation unit according to the embodiment.

An example of the load patterns calculated by the first calculation unit 15 is force or torque. FIG. 10 is a graph illustrating an example of the load patterns calculated by the first calculation unit 15. In FIG. 10, $T_1$ is the torque of the first electric motor 35. The first calculation unit 15 also calculates the load pattern of the second electric motor 36.

Figure 11:
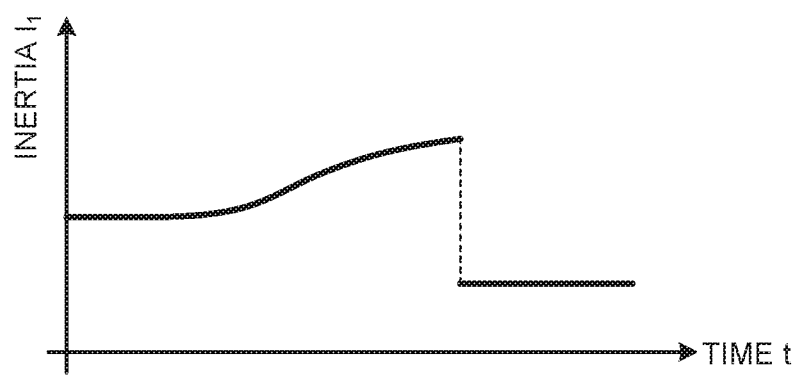
FIG. 11 is a graph illustrating an example of an inertia pattern calculated by the first calculation unit according to the embodiment.

An example of the inertia patterns calculated by the first calculation unit 15 is mass or moment of inertia. FIG. 11 is a graph illustrating an example of the inertia pattern calculated by the first calculation unit 15. In FIG. 11, $I_1$ is the moment of inertia of the first electric motor 35. The first calculation unit 15 also calculates the inertia pattern of the second electric motor 36.

The operation patterns, the load patterns, and the inertia patterns of the first electric motor 35 and the second electric motor 36 calculated by the first calculation unit 15 are held in the calculation result holding unit 16.

Next, based on the operation patterns, the load patterns, and the inertia patterns of the electric motors (the first electric motor 35 and the second electric motor 36) calculated in step S14, the capacity selection device 1 selects the capacities of the electric motors constituting the multi-axis system (step S15). In step S15, the capacity selection processing unit 18 selects a capacity of each electric motor. At this time, the calculation result selection unit 17 selects a necessary calculation result from among the calculation results held in the calculation result holding unit 16, and inputs it to the capacity selection processing unit 18. That is, when the capacity selection processing unit 18 selects the capacity of the first electric motor 35, the calculation result selection unit 17 reads the operation pattern, the load pattern, and the inertia pattern of the first electric motor 35 from the calculation result holding unit 16, and inputs them to the capacity selection processing unit 18. When the capacity selection processing unit 18 selects the capacity of the second electric motor 36, the calculation result selection unit 17 reads the operation pattern, the load pattern, and the inertia pattern of the second electric motor 36 from the calculation result holding unit 16, and inputs them to the capacity selection processing unit 18.

When the operation pattern, the load pattern, and the inertia pattern of the first electric motor 35 are inputted, the capacity selection processing unit 18 selects an electric motor capacity that allows operation according to the inputted operation pattern, load pattern, and inertia pattern as the capacity of the first electric motor 35. Likewise, when the operation pattern, the load pattern, and the inertia pattern of the second electric motor 36 are inputted, the capacity selection processing unit 18 selects an electric motor capacity that allows operation according to the inputted operation pattern, load pattern, and inertia pattern as the capacity of the second electric motor 36. The capacity selection processing unit 18 can select an electric motor capacity that allows operation according to a operation pattern of the electric motor if it knows at least the operation pattern of the electric motor (the operation pattern of the first electric motor 35, the operation pattern of the second electric motor 36). Therefore, the calculation result selection unit 17 just has to input at least the operation pattern of the electric motor to the capacity selection processing unit 18. When only the operation pattern of the electric motor is inputted to the capacity selection processing unit 18, the capacity selection processing unit 18 selects the capacity of the electric motor based on the inputted operation pattern. When at least one of the load pattern and the inertia pattern is inputted in addition to the operation pattern of the electric motor, the capacity selection processing unit 18 selects the capacity of the electric motor based on the inputted pieces of information.

Next, the capacity selection device 1 make notification of the selection results in step S15 (step S16). In step S16, the selection result notification unit 19 notifies the user of the capacity of the first electric motor 35 and the capacity of the second electric motor 36 selected in the capacity selection processing unit 18 by displaying them on the display device, for example. Instead of the display of the results of the selection by the capacity selection processing unit 18, or in addition to the display of the selection results, the selection result notification unit 19 may generate data indicating the selection results and output the data to the outside. Alternatively, instead of the display or in addition to the display, the selection result notification unit 18 may make notification of the selection results by voice.

In step S16, the capacity selection device 1 may also display the operation patterns of the first electric motor 35 and the second electric motor 36 in addition to the above-mentioned selection results. In this case, the capacity selection device 1 may receive a change of the operation patterns of the first electric motor 35 and the second electric motor 36. Specifically, the capacity selection device 1 may display the selection results in step S15, and the operation pattern of the first electric motor 35 and the operation pattern of the second electric motor 36, held in the calculation result holding unit 16, and wait for a change operation of an operation pattern of the user. When a change operation of at least one of the operation pattern of the first electric motor 35 and the operation pattern of the second electric motor 36 is performed, the capacity selection device 1 selects the capacities of the first electric motor 35 and the second electric motor 36 again, based on the changed operation pattern. The change of the operation pattern is received by the operation pattern acquisition unit 12. That is, upon receiving the operation pattern change operation, the operation pattern acquisition unit 12 changes at least one of the operation pattern of the first electric motor 35 and the operation pattern of the second electric motor 36, held by the calculation result holding unit 16, in accordance with the received change operation. When the operation pattern held by the calculation result holding unit 16 is changed, the calculation result holding unit 16 outputs the changed operation pattern to the second calculation unit 20.

FIG. 12 is a flowchart illustrating an example of the operation of the capacity selection device 1 performing selection of an electric motor (the first electric motor 35, the second electric motor 36) again. The flowchart illustrated in FIG. 12 represents the operation in a case when a change of the operation pattern of an electric motor is received. Steps S21 to S23 illustrated in FIG. 12 are executed following step S16 illustrated in FIG. 5.

When a change operation on at least one of the operation pattern of the first electric motor 35 and the operation pattern of the second electric motor 36 is received and the operation pattern is changed (step S21), the capacity selection device 1 executes steps S22 to S25 to select the capacities of the electric motors of the multi-axis system again and make notification of the selection results again.

Specifically, first, the second calculation unit 20 of the capacity selection device 1 performs forward kinematics calculation using the operation pattern of the first electric motor 35 and the operation pattern of the second electric motor 36 after the change, to calculate the operation pattern of the machine end 41, the load pattern of the machine end 41, and the inertia pattern of the machine end 41 (step S22).

Next, the first calculation unit 15 performs inverse kinematics calculation using the operation pattern of the machine end 41, the load pattern of the machine end 41, and the inertia pattern of the machine end 41, calculated by the second calculation unit 20 and the specification information that has already been acquired in step S12 illustrated in FIG. 5, to calculate the operation patterns, the load patterns, and the inertia patterns of the electric motors (the first electric motor 35 and the second electric motor 36) of the multi-axis system again (step S23). The processing in step S23 is substantially the same as the processing in step S14 illustrated in FIG. 5.

Next, based on the operation patterns, the load patterns, and the inertia patterns of the electric motors calculated by the first calculation unit 15, the capacity selection processing unit 18 selects the capacities of the electric motors again (step S24). The processing in step S24 is substantially the same as the processing in step S15 illustrated in FIG. 5.

After selecting the capacities of the electric motors of the multi-axis system, that is, the first electric motor 35 and the second electric motor 36 again, the capacity selection device 1 make notification of the selection results again (step S25).

In this way, when an operation for changing the operation patterns of the electric motors constituting the multi-axis system is performed, the capacity selection device 1 calculates the operation pattern, the load pattern, and the inertia pattern of the machine end 41 of the multi-axis system based on the changed operation patterns, and further performs the selection of the electric motors constituting the multi-axis system again, based on the operation pattern, the load pattern, and the inertia pattern of the machine end 41 of the multi-axis system.

As described above, the electric motor capacity selection device 1 according to the present embodiment includes the multi-axis system model holding unit 10 that holds a plurality of types of multi-axis system models each representing the configuration of a multi-axis system constructed by combination of a plurality of machine elements and a plurality of electric motors, the capacity selection unit 2 that selects the capacities of the electric motors constituting the selected multi-axis system model based on the multi-axis system model selected from among the plurality of multi-axis system models held by the multi-axis system model holding unit 10, and the selection result notification unit 19 that makes notification of the capacity selection results of the electric motors by the capacity selection unit 2. The electric motor capacity selection device 1 according to the present embodiment eliminates the need for the user to work to connect the machine elements, and can reduce the burden on the user.

In the present embodiment, the first calculation unit 15 performs inverse kinematics calculation using the operation pattern of the machine end of the multi-axis system, the load pattern of the machine end of the multi-axis system, and the inertia pattern of the machine end of the multi-axis system, thereby to determine the operation patterns, the load patterns, and the inertia patterns of the electric motors constituting the multi-axis system. In another way, by performing inverse kinematics calculation using at least one of the operation pattern of the machine end of the multi-axis system, the load pattern of the machine end of the multi-axis system, and the inertia pattern of the machine end of the multi-axis system, the operation patterns, the load patterns, and the inertia patterns of the electric motors constituting the multi-axis system can be determined. Therefore, the first calculation unit 15 may calculate the operation patterns, the load patterns, and the inertia patterns of the electric motors constituting the multi-axis system, based on the multi-axis system model and the specification information on the multi-axis system model, on the one hand, and at least one of the operation pattern, the load pattern, and the inertia pattern of the machine end of the multi-axis system, on the other hand. In this case, the second calculation unit 20 may calculate only information used in inverse kinematics calculation by the first calculation unit 15, instead of calculating all of the operation pattern, the load pattern, and the inertia pattern of the machine end of the multi-axis system. For example, when the first calculation unit 15 performs inverse kinematics calculation using only the operation pattern of the machine end, the second calculation unit 20 may calculate only the operation pattern of the machine end.

The configuration illustrated in the above embodiment illustrates an example of the subject matter of the present invention, and can be combined with other publicly known arts and partly omitted and/or modified without departing from the scope of the present invention.

REFERENCE SIGNS LIST 1 electric motor capacity selection device; 2 capacity selection unit; 10 multi-axis system model holding unit; 11 specification information acquisition unit; 12 operation pattern acquisition unit; 13 load pattern acquisition unit; 14 inertia pattern acquisition unit; 15 first calculation unit; 16 calculation result holding unit; 17 calculation result selection unit; 18 capacity selection processing unit; 19 selection result notification unit; 20 second calculation unit; 30 first link; 31 second link; 32 third link; 35 first electric motor; 36 second electric motor; 40 coordinate system; 41 machine end; 51 to 54 multi-axis system model.

The invention claimed is:

1. An electric motor capacity selection device, comprising:
   a multi-axis system model holding memory to hold a plurality of types of multi-axis system models each representing a configuration of a multi-axis system constructed by combination of a plurality of machine elements and a plurality of electric motors;
   capacity selection circuitry to select, based on a selected multi-axis system model that is one multi-axis system model selected from among the plurality of types of multi-axis system models held by the multi-axis system model holding memory, capacities of the electric motors constituting a multi-axis system model represented by the selected multi-axis system model;
   operation pattern acquisition circuitry to acquire a first operation pattern that is an operation pattern of a machine end of the multi-axis system represented by the selected multi-axis system model;
   first calculation circuitry to calculate second operation patterns that are operation patterns of the electric motors constituting the multi-axis system model represented by the selected multi-axis system model;
   a selection result notification display to make notification of an interim selection result by the capacity selection circuitry, wherein
   the operation pattern acquisition circuitry is further configured to receive a change operation of the second operation patterns calculated by the first calculation unit, the change operation indicating a change to the operation patterns of the electric motors constituting the multi-axis system model represented by the selected multi-axis system model,
   the capacity selection circuitry further comprises a second calculation circuitry to calculate, according to a forward kinematics calculation, a modified first operation pattern that is the operation pattern of the machine end of the multi-axis system based on the first operation pattern and the change to the operation patterns of the electric motors,
   the first calculation circuitry is further configured to calculate, according to an inverse kinematics calculation, modified second operation patterns that are the operation patterns of the electric motors based on the modified first operation pattern,
   the capacity selection circuitry is further configured to select modified capacities of the electric motors constituting the multi-axis system model represented by a modified selected multi-axis system model based on the modified second operation patterns, and
   the selection result notification display is further configured to make notification of the modified selection result by the capacity selection circuitry.

2. The electric motor capacity selection device according to claim 1, further comprising:
   specification information acquisition circuitry to acquire specification information on the machine elements of the multi-axis system represented by the selected multi-axis system model,
   wherein the capacity selection circuitry selects the capacities based on the specification information, the first operation pattern, and the selected multi-axis system model.

3. The electric motor capacity selection device according to claim 2, further comprising:

load pattern acquisition circuitry to acquire a first load pattern that is a load pattern of the machine end of the multi-axis system represented by the selected multi-axis system model; and inertia pattern acquisition circuitry to acquire a first inertia pattern that is an inertia pattern of the machine end of the multi-axis system represented by the selected multi-axis system model, wherein the capacity selection circuitry selects the capacities based on the specification information, the first operation pattern, the selected multi-axis system model, and at least one of the first load pattern and the first inertia pattern.

4. The electric motor capacity selection device according to claim 3, wherein the first calculation circuitry is further configured to calculate second load patterns that are load patterns of the electric motors constituting the multi-axis system model represented by the selected multi-axis system model, and second inertia patterns that are inertia patterns of the electric motors constituting the multi-axis system model represented by the selected multi-axis system model, based on the specification information, the first operation pattern, the first load pattern, the first inertia pattern, and the selected multi-axis system model, and the capacity selection circuitry further comprises capacity selection processing circuitry to select the capacities based on the second operation patterns, the second load patterns, and the second inertia patterns, which are calculated by the first calculation circuitry.

5. The electric motor capacity selection device according to claim 4, wherein the second calculation circuitry is further configured to calculate the first load pattern, and the first inertia pattern based on the second operation patterns after the change when the operation pattern acquisition circuitry receives the change to the operations patterns of the electric motors, when the second calculation circuitry calculates the first operation pattern, the first load pattern, and the first inertia pattern, the first calculation circuitry calculates the second operation patterns, the second load patterns, and the second inertia patterns again, based on the specification information acquired by the specification information acquisition circuitry, the first operation pattern, first load pattern, and first inertia pattern calculated by the second calculation circuitry, and the selected multi-axis system model, and the capacity selection processing circuitry selects the capacities again, based on the second operation patterns, the second load patterns, and the second inertia patterns, calculated by the first calculation circuitry again.

6. The electric motor capacity selection device according to claim 2, wherein the specification information acquisition circuitry acquires specification information commonly used in selection of the capacities of the electric motors in one-time processing.

7. The electric motor capacity selection device according to claim 2, wherein the specification information acquisition circuitry acquires specification information commonly used in selection of the capacities of the electric motors in one-time processing.

8. The electric motor capacity selection device according to claim 1, further comprising:

specification information acquisition circuitry to acquire specification information on the machine elements of the multi-axis system represented by the selected multi-axis system model; and load pattern acquisition circuitry to acquire a first load pattern that is a load pattern of a machine end of the multi-axis system represented by the selected multi-axis system model, wherein the capacity selection circuitry selects the capacities based on the specification information acquired by the specification information acquisition circuitry, the first load pattern, and the selected multi-axis system model.

9. The electric motor capacity selection device according to claim 8, wherein the first calculation circuitry is further configured to calculate second load patterns that are load patterns of the electric motors constituting the multi-axis system model represented by the selected multi-axis system model, and second inertia patterns that are inertia patterns of the electric motors constituting the multi-axis system model represented by the selected multi-axis system model, based on the specification information acquired by the specification information acquisition circuitry, the first load pattern, and the selected multi-axis system model, and the capacity selection circuitry further comprises capacity selection processing circuitry to select the capacities, based on the second operation patterns, the second load patterns, and the second inertia patterns, calculated by the first calculation circuitry.

10. The electric motor capacity selection device according to claim 9, wherein the second calculation circuitry is further configured to calculate the first load pattern based on the second operation patterns after a change when the operation pattern acquisition circuitry receives the change operation, when the second calculation circuitry calculates the first load pattern, the first calculation circuitry calculates the second operation patterns, the second load patterns, and the second inertia patterns again, based on the specification information acquired by the specification information acquisition circuitry, the first load pattern calculated by the second calculation circuitry, and the selected multi-axis system model, and the capacity selection processing circuitry selects the capacities again, based on the second operation patterns, the second load patterns, and the second inertia patterns, calculated by the first calculation circuitry again.

11. The electric motor capacity selection device according to claim 8, wherein the specification information acquisition circuitry acquires specification information commonly used in selection of the capacities of the electric motors in one-time processing.

12. The electric motor capacity selection device according to claim 1, further comprising:

specification information acquisition circuitry to acquire specification information on the machine elements of the multi-axis system represented by the selected multi-axis system model; and inertia pattern acquisition circuitry to acquire a first inertia pattern that is an inertia pattern of a machine end of the multi-axis system represented by the selected multi-axis system model,
wherein the capacity selection circuitry selects the capacities based on the specification information acquired by the specification information acquisition circuitry, the first inertia pattern, and the selected multi-axis system model.

13. The electric motor capacity selection device according to claim 12, wherein
the first calculation circuitry is further configured to calculate second load patterns that are load patterns of the electric motors constituting the multi-axis system model represented by the selected multi-axis system model, and second inertia patterns that are inertia patterns of the electric motors constituting the multi-axis system model represented by the selected multi-axis system model, based on the specification information acquired by the specification information acquisition circuitry, the first inertia pattern, and the selected multi-axis system model, and
the capacity selection circuitry further comprises capacity selection processing circuitry to select the capacities, based on the second operation patterns, the second load patterns, and the second inertia patterns, calculated by the first calculation circuitry.

14. The electric motor capacity selection device according to claim 13,
wherein the second calculation circuitry is further configured to calculate the first inertia pattern based on the second operation patterns after a change when the operation pattern acquisition circuitry receives the change operation,
when the second calculation circuitry calculates the first inertia pattern, the first calculation circuitry calculates the second operation patterns, the second load patterns, and the second inertia patterns again, based on the specification information acquired by the specification information acquisition circuitry, the first inertia pattern calculated by the second calculation circuitry, and the selected multi-axis system model, and
the capacity selection processing circuitry selects the capacities again, based on the second operation patterns, the second load patterns, and the second inertia patterns, calculated by the first calculation circuitry again.

15. The electric motor capacity selection device according to claim 12, wherein the specification information acquisition circuitry acquires specification information commonly used in selection of the capacities of the electric motors in one-time processing.

16. A computer implemented capacity selection method, comprising:
a capacity selection step of selecting, based on a selected multi-axis system model that is one multi-axis system model selected from among a plurality of types of multi-axis system models each representing a configuration of a multi-axis system constructed by combination of two or more machine elements and two or more electric motors, capacities of the electric motors constituting the multi-axis system model represented by the selected multi-axis system model;
an operation pattern acquisition step of acquiring a first operation pattern that is an operation pattern of a machine end of the multi-axis system represented by the selected multi-axis system model;
a first calculation step of calculating second operation patterns that are operation patterns of the electric motors constituting the multi-axis system model represented by the selected multi-axis system model;
an interim selection result notification step of making notification of an interim selection result in the capacity selection step;
a step of receiving a change operation of the second operation patterns, the change operation indicating a change to the operation patterns of the electric motors constituting the multi-axis system model represented by the selected multi-axis system model;
a second calculation step of calculating, according to a forward kinematics calculation, a modified first operation pattern that is the operation pattern of the machine end of the multi-axis system based on the first operation pattern and the change to the operations patterns of the electric motors;
a step of calculating, according to an inverse kinematics calculation, modified second operation patterns that are the operation patterns of the electric motors based on the modified first operation pattern;
a step of selecting modified capacities of the electric motors constituting the multi-axis system model represented by a modified selected multi-axis system model based on the modified second operation patterns; and
a modified selection result notification step of making notification of the modified selection result.

17. A non-transitory computer readable storage medium including a capacity selection program to cause a computer to execute:
a capacity selection step of selecting, based on a selected multi-axis system model that is one multi-axis system model selected from among a plurality of types of multi-axis system models each representing a configuration of a multi-axis system constructed by combination of two or more machine elements and two or more electric motors, capacities of the electric motors constituting the multi-axis system model represented by the selected multi-axis system model;
an operation pattern acquisition step of acquiring a first operation pattern that is an operation pattern of a machine end of the multi-axis system represented by the selected multi-axis system model;
a first calculation step of calculating second operation patterns that are operation patterns of the electric motors constituting the multi-axis system model represented by the selected multi-axis system model;
an interim selection result notification step of making notification of an interim selection result in the capacity selection step;
a step of receiving a change operation of the second operation patterns, the change operation indicating a change to the operation patterns of the electric motors constituting the multi-axis system model represented by the selected multi-axis system model;
a second calculation step of calculating, according to a forward kinematics calculation, a modified first operation pattern that is the operation pattern of the machine end of the multi-axis system based on the first operation pattern and the change to the operations patterns of the electric motors;
a step of calculating, according to an inverse kinematics calculation, modified second operation patterns that are the operation patterns of the electric motors based on the modified first operation pattern;

a step of selecting modified capacities of the electric motors constituting the multi-axis system model represented by a modified selected multi-axis system model based on the modified second operation patterns; and
a modified selection result notification step of making notification of the modified selection result.

* * * * *